March 9, 1965 K. RÄNTSCH 3,172,940
OPTICAL DEVICE FOR A CORRECT ADJUSTMENT AND READING OF THE
LENGTH OF A SLIDABLE DISPLACEMENT OF THE CARRIAGE
ON A LENGTH MEASURING DEVICE
Filed Feb. 3, 1959 9 Sheets-Sheet 1

INVENTOR
Kurt Räntsch
BY
Singer Stern & Carlberg
attys

March 9, 1965 K. RÄNTSCH 3,172,940
OPTICAL DEVICE FOR A CORRECT ADJUSTMENT AND READING OF THE
LENGTH OF A SLIDABLE DISPLACEMENT OF THE CARRIAGE
ON A LENGTH MEASURING DEVICE
Filed Feb. 3, 1959 9 Sheets-Sheet 2

March 9, 1965 K. RÄNTSCH 3,172,940
OPTICAL DEVICE FOR A CORRECT ADJUSTMENT AND READING OF THE
LENGTH OF A SLIDABLE DISPLACEMENT OF THE CARRIAGE
ON A LENGTH MEASURING DEVICE
Filed Feb. 3, 1959 9 Sheets-Sheet 6

INVENTOR.
Kurt Räntsch
BY
Singer Stern & Carlberg
attys.

March 9, 1965 K. RÄNTSCH 3,172,940
OPTICAL DEVICE FOR A CORRECT ADJUSTMENT AND READING OF THE
LENGTH OF A SLIDABLE DISPLACEMENT OF THE CARRIAGE
ON A LENGTH MEASURING DEVICE
Filed Feb. 3, 1959 9 Sheets-Sheet 8

Inventor
Kurt Räntsch
By
Singer Stern & Carlberg
Attys

Fig.16

3,172,940
OPTICAL DEVICE FOR A CORRECT ADJUSTMENT AND READING OF THE LENGTH OF A SLIDABLE DISPLACEMENT OF THE CARRIAGE ON A LENGTH MEASURING DEVICE
Kurt Räntsch, Wetzlar, Germany, assignor to M. Hensoldt & Söhne, Optische Werke A.G., Wetzlar, Germany
Filed Feb. 3, 1959, Ser. No. 790,917
Claims priority, application Germany, Feb. 10, 1958, H 32,365
8 Claims. (Cl. 88—14)

The invention relates to an optical device for permitting a correct adjustment and reading of the length of a slidable displacement of a carriage on machine tools, linear measuring machines and the like, in which is employed a rule and a reading device which is relatively movable with respect to the said rule and in which optical elements are provided which project a portion of the rule onto the reticle of the reading device.

In order to obtain in machines of the mentioned type the desired values which are free of guideway errors, it is known that special provisions have to be made.

In machine tools it was heretofore not customary at all to eliminate the effect of any guideway errors. This is due to the fact that heretofore on one hand the importance of such guideway errors was not appreciated and on the other hand it was considered impossible to find a satisfactory solution for the elimination of such guideway errors.

It is one object of the present invention to provide means to eliminate the effect of such guideway errors in a simple manner, particularly in machine tools and length measuring devices. It is also an object of the invention, to eliminate the mentioned guideway errors without the employment of extensive optical means and without sacrificing the measuring accuracy.

Still another object of the invention is to construct the means for eliminating the guideway errors in a manner that the means may be used universally in all types of machines and devices, namely, whenever guideway errors may cause incorrect readings of the measurements made.

The objects of the invention can be solved only in an optical manner and in accordance with the present invention means are provided in the mentioned machine and devices, the projection rays are arranged within the measuring carriage through optical elements arranged parallel to the measuring direction or through movable optical elements. These optical elements have the effect that at small inclinations of the carriage, caused by errors in the guideways, they will maintain their position relative to the ideal position of the guideway or to the space and compensate the deflection of the rays caused by the inclination of the carriage.

In such a construction, the optical elements which maintain their position parallel to the measuring direction may consist of pendulum members. Such pendulum members have been employed in other fields, for instance in the art of stabilizing a target line in level instruments.

The present invention, however, is not limited to such pendulum members which are slidable with the measuring carriage. It has been established that the optical element which maintains its position relative to the ideal guideway or in the space according to the invention may be replaced by a mirror strip which is a plane marked mirror and which is stationary mounted in the machine and is positioned parallel to the measuring direction and may have approximately the length of the conventional rule attached to the machine itself. Such a mirror strip which is secured to the base of the machine will always retain its position within the space. Any tilting movements which give rise to measuring errors are performed only by the projecting elements mounted on the carriage and slidable therewith. The measuring errors, however, will be compensated by the mirror strip.

These elements do not have the disadvantages of a stationary mirror which in known devices is positioned at right angles to the measuring direction, because they may be arranged within the immediate neighborhood of the measuring point and the reading device.

If it is not desired to employ such a long linear mirror strip, then the present invention provides another embodiment consisting of a slidable mirror which moves with the carriage and is mounted in a very accurate guideway extending parallel to the strip.

Of course, when employing such an element, it is possible that minor measuring errors may occur owing to minor errors in the guideway of the mirror. These errors, however, are extremely small compared with those errors which occur when the carriage on the machine tool moves along a guideway which has been damaged, because the forces and stresses which have to be overcome in both types of guideways are entirely different from each other.

In order, however, to eliminate definitely any such guideway errors of the slidable mirror, it is also possible in accordance with a still further embodiment of the invention, to mount the mirror upon a carriage which in the manner of a cableway travels upon a cable extending parallel to the linear rule secured to the machine tool. In such an arrangement the cable may hang slack because any vertical displacements of the mirror owing to its particular arrangement will not influence the measuring result. Of course, lateral displacements of the mirror would be noticeable in the measuring result. Such lateral displacements, however, are not possible because every cable will always hang slack in a vertical plane. Preferably the cable is mounted in a special carrier so that the tension of the cable does not result in deformation of the machine.

It is also possible to employ a mercury mirror arranged in the carriage as a compensating element.

When the invention is used in connection with a linear measuring machine in which a fixed rule is provided and in which a slidable carriage carries an optical objective with a reading device, then it is advisable to arrange in rear of the objective at least one mirror which is slidable with the carriage and deflects the light rays inclined toward the rule. The light rays impinge then upon a mirror which retains its position and which directs the light rays through a further objective lens onto the reticle of the reading device.

In such an arrangement the rule may itself be constructed as a mirror surface. Since the rule is stationary it always retains its position in space.

In general, however, one will not make the rule in the form of a mirror surface and therefore, in accordance with still another embodiment of the invention, there is arranged in rear of the objective a reflecting square which displaces the light rays laterally and inclined toward the rule and onto a mirror rule. The mirror rule in this arrangement may be arranged directly adjacent the conventional rule in the machine.

Also in this embodiment there exists the possibility of replacing the mirror rule by a movable mirror which is slidably mounted in a guideway. In such a case, the mirror to moved in unison with the measuring carriage.

In such an arrangement the rule is suitably arranged at the distance equal to the focal length of the objective from the latter. When the distance between the ruler and the measuring axis is also the same as the focal length of the objective and when the compensating means are arranged in the parallel path of the rays, then there will occur a double angular displacement on the stationary mirror rule when the measuring carriage performs small tiltable movements. This result can be compensated in a manner as it is done in level instruments, namely by means of the Galilean system of double enlargement, or in such a manner that the distance between the measuring axis and the ruler is made equal to the double focal length of the objective which latter is used to project the ruler into infinity.

The compensation means of the present invention are suitable also for a case in which the measuring rule and the measuring axis are arranged in a substantially horizontal plane. The mirror which retains its position is then advantageously arranged to move in a guideway which extends parallel to the measuring rule or is guided vertically along a cable positioned parallel to the measuring rule.

The light rays which pass parallel through the first objective are then condensed by a second objective and projected onto a reticle. This objective also is suitable to compensate the occurring doubling of the angle. In this case the second objective may be arranged at a distance equal to one half of its focal length from the mirror which retains its position. The reticle itself is again arranged in the focal plane of the second objective. The distance of this second objective from the mirror which retains its position is measured along the optical axis. Since this distance changes somewhat when the device performs small inclinations, it is possible that small inaccuracies occur in the compensation.

These inaccuracies can be eliminated in another embodiment of the invention which has the following advantageous arrangement. The mirror which is positioned in rear of the projection objective deflects the light rays approximately parallel to the measuring rule. There is provided for the purpose of compensation of the mentioned inaccuracy a reflecting square in the measuring direction. This reflecting square has one mirror face which deflects the rays coming from the second objective almost vertically onto the mirror arranged parallel to the measuring rule which last mentioned mirror retains its position while the second mirror of the reflecting square reflects the light rays coming from the parallel mirror onto the reticle.

This arrangement described in connection with linear measurement machines may be transferred directly to machine tools. It is only necessary to identify the measuring axis with the operating plane in which the workpiece is arranged and to introduce the correct distance of the operating plane from the measuring plane at the points where it is necessary to determine the correct distance of the measuring axis from the measuring plane. In machine tools the distance of the operating plane from the measuring plane varies when a new workpiece is inserted into the machine tool and which has to be operated upon or machined in a different elevation.

The errors which occurred heretofore in the conventional machine tools have never been eliminated. According to the present invention, however, an elimination of these errors is easily possible in that means are provided which change the distance of the mentioned second objective from the mirror retaining its position.

This object of the invention can be accomplished in that the second objective and the reticle are displaced in the direction of the light rays. It is, however, of greater advantage when the mentioned reflecting square is slidably adjusted parallel to the measuring axis. When this is done, the distance of the second objective changes from the mirror which retains its position. In this arrangement there also exists the possibility to arrange the measuring rule and the measuring axis in a horizontal plane. In such case the mirror which retains its position will be guided, for example, by means of a cable.

The means described up to now for effecting a compensation of guideway errors are all distinguished in this that the mirror which retains its position relative to the ideal carriage guidance is fixedly attached to the machine bed. Of course, as mentioned in the foregoing, it is also possible to employ swinging optical elements in place of this mirror which retains its position relative to the ideal guideway of the carriage. One may also employ in place of such a swinging mirror a mercury mirror.

The mentioned swinging optical elements may consist of plane mirrors. It is, however, also possible to employ at least one swinging lens which cooperates with at least one fixedly mounted lens in such a manner that the swinging lens and the stationary lens in their zero position form a plane parallel plate which, however, when the swinging lens is moved, form an optical wedge. If one employs these means for instance in a machine tool, such as a radial drilling machine, then it is advisable for obtaining a compensation of guideway errors to arrange the measuring rule at a distance equal to the focal length of the projection objective away from the latter, while at the same time the distance of the working plane from the measuring rule is made equal to the focal length of the objective. Furthermore, it is of advantage to position a fixedly mounted plane mirror between the measuring rule and the objective and to arrange the swinging optical elements in rear of the objective in the parallel path of the light rays.

For the purpose of compensating the guideway errors one may position a reflecting square in rear of the projection objective, whereby one mirror surface of the reflecting square is made rotatable about an axis extending transversely to the measuring rule. Of course, one may also use in this instance a swinging lens compensator.

Furthermore, it is possible to arrange in rear of the projection objective a prism constructed or suspended as a double pendulum and provide for a deflection of the rays about an angle of 180°. The length of the pendulum arms is equal to $a/2$ when the distance of the measuring rule from the working plane is equal to $a$. This last mentioned embodiment of the invention creates the possibility to make the distance of the working plane from the measuring rule adjustable in a very simple manner. It is only necessary to provide means to change the length of the pendulum arms.

All these embodiments of the invention have in common that the measuring rule, the workpiece and the compensating means (on their movements respectively), are arranged parallel to one another so that the measuring rule and the workpiece are arranged as far as the projection is concerned in a superimposed position.

The invention is suitable for very simple applications when in accordance with another embodiment of the invention the measuring rule and the measuring plane are virtually superimposed by optical elements which retain their position. As an optical element which retains its position, one may also use a plane mirror which is inclined at an angle of 45° with respect to the plane of the measuring rule and the measuring plane and has approximately the length of the measuring rule. This mirror may also consist of another mirror inclined at an angle of 45° with respect to the measuring rule and the measuring plane but which is movable in a guideway parallel to the measuring rule and to the measuring plane. The guideway may consist of one of the guides which are employed in a manner described in the foregoing. It is of advantage to rigidly connect the measuring rule and the workpiece by means of a support, whereby the support at the same time carries a mirror which retains its position or which is movable. The viewing system may again be slidable along the measuring rule. The viewing system for the measuring rule may consist of a first microscope into which the light rays are conducted by means of a mirror which retains its position. For the viewing of the testpiece may be used a second microscope which is rigidly connected with the first microscope and which receives the light rays by means of suitable mirrors. The arrangement is such that the target axes of both microscopes are in alignment.

If the device of the invention just described is used in a machine tool, for instance in a drilling machine, it is advisable to arrange the tool, namely the drill, in the virtual optical axis in rear of the element which retains its position. In such a case only a single microscope is necessary to serve as a viewing system which observes the measuring rule. The second microscope in this case can then be omitted.

In still another embodiment of the invention the mirror which retains its position is arranged at an angle of 45° with respect to the measuring rule and with respect to the measuring plane. In this case is now employed a semi-transparent mirror arranged between the surface of two rectangular prisms which form a hypotenuse. In this case a further embodiment of the invention provides that one of the short sides of a rectangular prism carries the measuring rule. A plane mirror arranged in rear of the surface formed by the short side of a rectangular prism projects the measuring rule virtually in rear thereof and through the semi-transparent mirror surface arranged at an angle of 45° so as to produce a superimposed virtual image of the measuring rule and the measuring plane. The measuring plane and the semi-transparent mirror and under certain conditions also the reflecting square may be arranged stationary. In such a case the viewing optic is slidable along the measuring rule. The semi-transparent mirror in this arrangement may at the same time be used for entering into the measuring rays an illuminating beam of light.

This last mentioned embodiment of the invention permits a viewing of the measuring rule and the measuring plane by means of an optic arranged at an angle.

Furthermore, diaphragms may be arranged in rear of the measuring rule and also between the semi-transparent mirror layer and the measuring plane for selectively interrupting the path of the light rays coming from the measuring rule or the measuring plane. These last described devices may be used in the same manner as the other devices in connection with the initially mentioned machine tools.

The accompanying drawings illustrate several embodiments of the invention.

Figure 1:
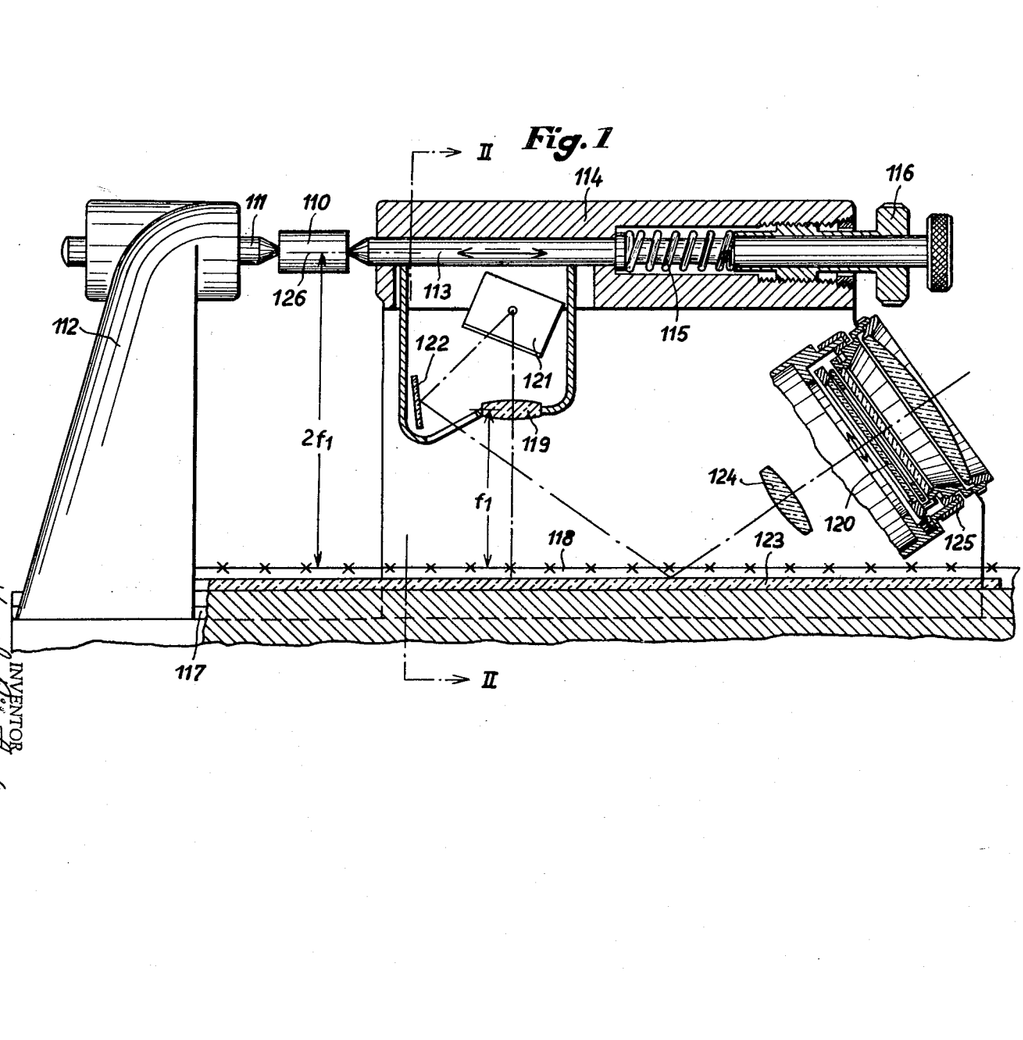
FIG. 1 is a longitudinal section of a linear measurement machine.
Figures 2, 4:
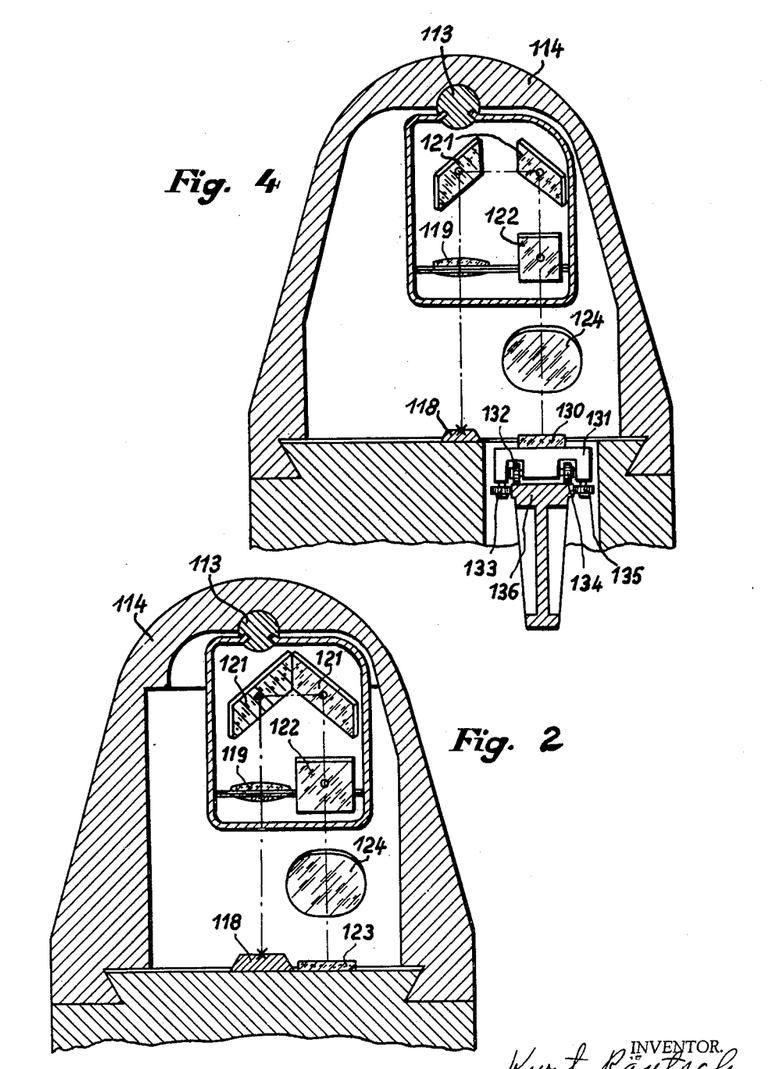
FIG. 2 is a sectional view along the line II—II of FIG. 1.
FIG. 4 is a sectional view along the line IV—IV of FIG. 3.

Referring to the drawings, the FIGS. 1 and 2 show a linear measurement machine which is equipped with a device of the present invention. As shown in FIG. 1, the workpiece 110 to be measured is mounted between the tail spindle 111 of the tailstock 112 and the tail spindle 113 of a measuring carriage 114. The tail spindle 113 is subject to the action of a spring 115, the tension of which may be varied by an adjusting screw 116.

A measuring rule 118 is fixedly attached to the machine bed 117. The measuring carriage 114 carries a reading device 125 constructed in similar manner as the reading device described and claimed in United States patent application Serial No. 633,680, filed January 11, 1957, now abandoned. In the reading window 120 of this reading device 125 can be observed an image of parts of the measuring rule 118 which appears in the optical axis of an objective lens 119. The light rays from the rule 118 pass through the lens 119 and a reflecting square 121, a plane mirror 122 and a mirror strip 123 into the reading device 125. The measuring rule 118 is arranged at a distance which is equal to the focal length $f_1$ of the objective 119. The light rays are condensed by an objective lens 124 and then are projected into the reading window 120.

In the reading window 120 is arranged a mark or a reading scale. The relative position of the projected scale line of the measuring rule 118 to this mark or to this reading scale permits a determination of the size of slidable displacement which has taken place. This measuring carriage 114 is slidable in the guideway 117.

The described path of the light rays is provided for the purpose of compensating guideway errors which for instance would cause the measuring carriage 114 to tilt. When this takes place, another portion of the measuring rule 118 would normally be projected into the reading window 120. If, however, the light rays in accordance with the invention are directed toward the mirror rule 123 which latter is arranged stationary in the space, then a compensation of these guideway errors is obtained.

Figure 3:
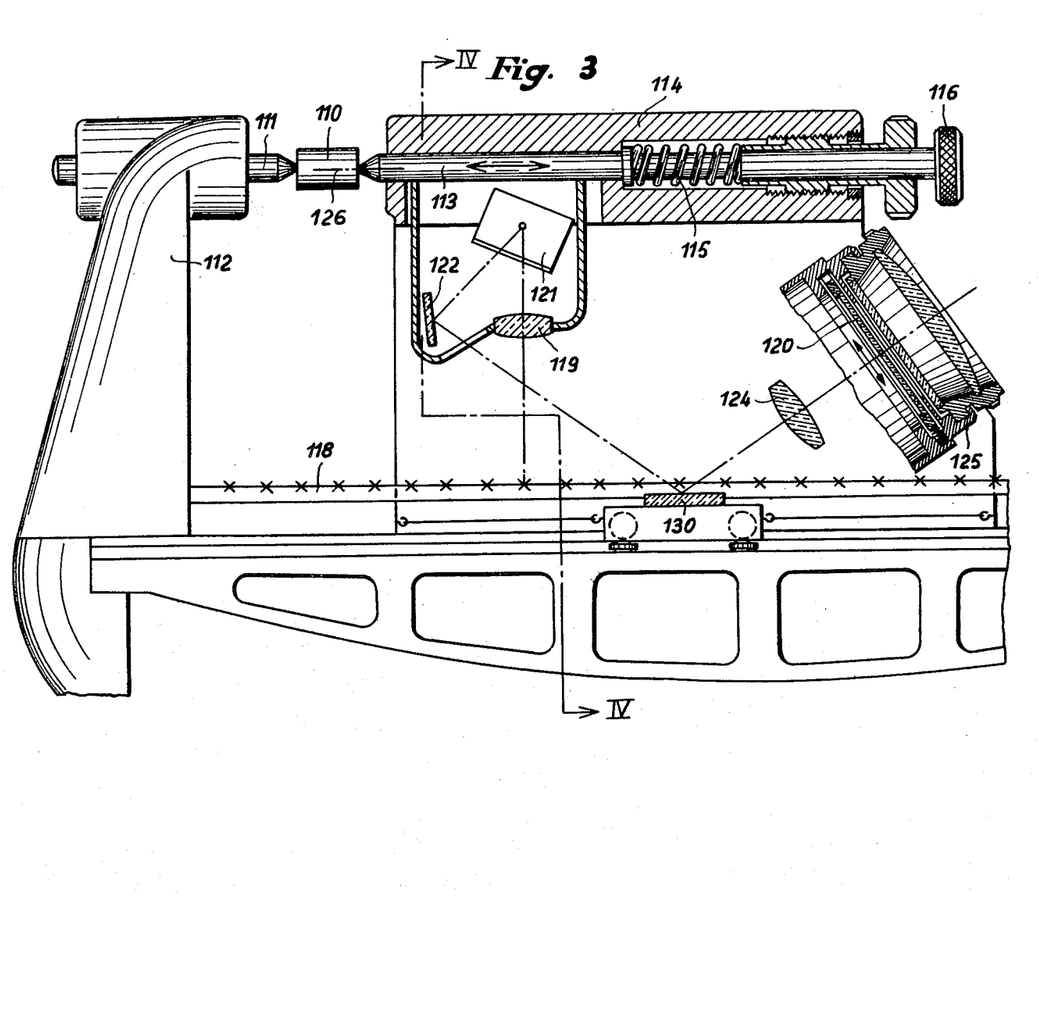
FIG. 3 is a modified construction of the machine shown in FIG. 1.

A modification of this linear measuring machine is shown in the FIGS. 3 and 4. In place of the mirror strip 123 is now employed a plane mirror 130. The plane mirror 130 is secured upon a carriage 131 which travels by means of four rollers 132, 133, 134 and 135 along a guideway 136. The carriage 131 is connected with the measuring carriage 114. The operation of this device is the same as the one shown in FIGS. 1 and 2.

In this modified device the light rays coming from the measuring rule 118 are also laterally displaced by the reflecting square 121 and are projected onto the mirror 130. From here the light rays are projected into the objective 124 and by the latter into the reading window 120. When the measuring carriage 114 is slidably displaced the mirror 130 retains its position in space provided only that the guideway 136 is made sufficiently accurate.

In the device shown in the FIGS. 1 to 4 inclusive, the measuring axis 126 is arranged at a distance equal to twice the focal length of the objective 119 away from the rule 118. This distance assures that when the carriage 114 is tilted that the deflection of the light rays will be compensated by the mirror strip 123 or by the mirror 130.

Figure 5:
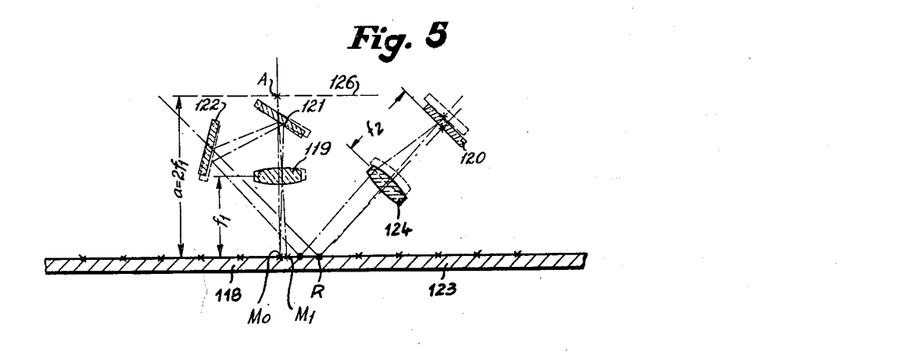
FIG. 5 illustrates diagrammatically the optical elements for explaining the operation of the means according to the FIGS. 1 to 4 inclusive.

The optical conditions prevailing in the embodiment of the invention as shown in the FIGS. 1 to 4 inclusive, are illustrated in FIG. 5. The measuring rule 118 which in this illustration for simplicity sake illustrates at the same time the mirror strip 123 is arranged at a distance equal to the focal length $f_1$ of the lens 119. The measuring axis 126 is arranged at a distance from the measuring rule which is equal to twice the focal length of the lens 119. Owing to this arrangement a double angle deflection which usually takes place at the reflection point R is compensated.

Figure 6:
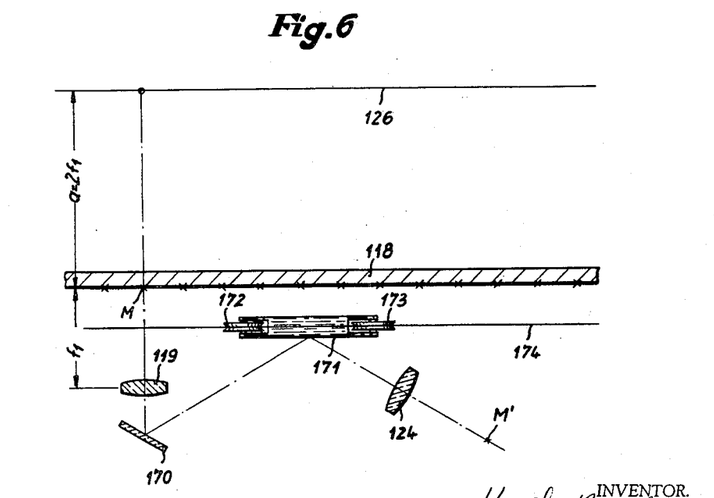
FIG. 6 illustrates diagrammatically the machine of FIG. 3 in a modified construction.

FIG. 6 illustrates a modified embodiment of the invention and is a top elevation view of the arrangement shown in FIG. 4 when the latter has been rotated in anticlockwise direction about an angle of 90°. After such a rotation the measuring axis 126 extending through the center of the spindle 113 and the center line of the measuring rule 118 will be arranged in a horizontal plane, and the slidable mirror 171—which in FIG. 4 is indicated by the reference numeral 130 and is positioned horizontally—will now be arranged with its reflecting face in a vertical plane. The objective 119 projects by means of a plane mirror 170 and a mirror 171 the scale line M of the rule 118 into infinity. The mirror 171 is suspended by means of a cable 174 passing over to sheaves 172 and 173. All the parts 119, 170, 171, 124 etc. are slidable with the measuring carriage 114. The described cable arrangement assures that the mirror 171 retains its position within the space relative to the compensating path of the light rays. A slack in the cable does not make any difference. The objective lens 124 produces a real image M' of the scale line M.

Figure 7:
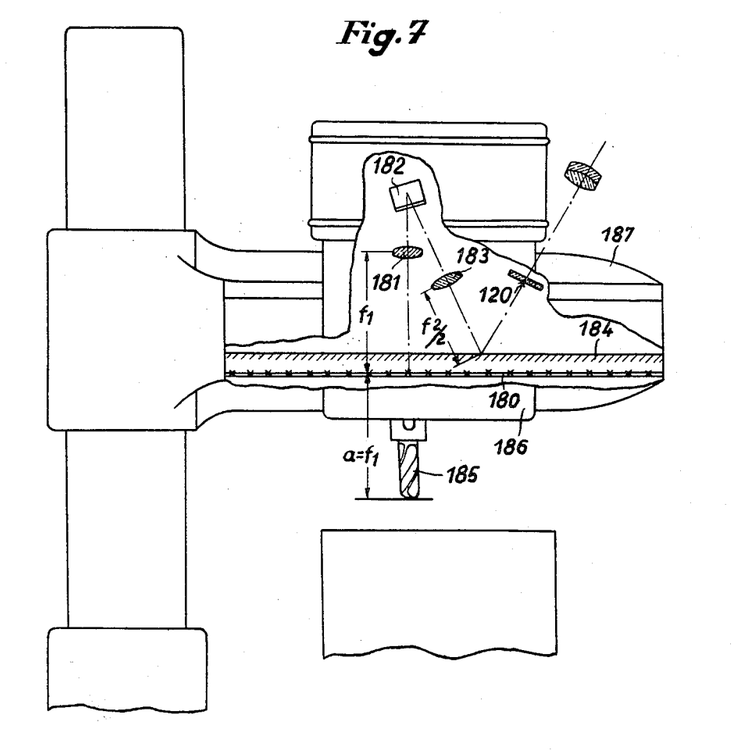
FIG. 7 is a diagrammatic elevation view of a radial drilling machine.
Figure 8:
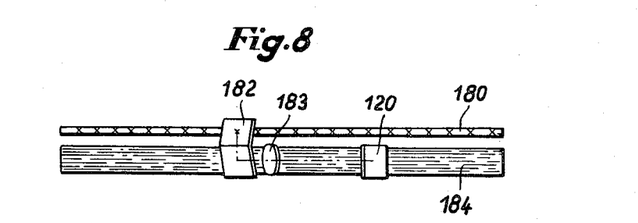
FIG. 8 is a top plan view of the measuring rule employed in FIG. 7.

The FIGS. 7 and 8 illustrate the application of the invention on a radial drilling machine. The scale lines of the measuring rule 180 are projected by an objective 181, a reflecting square 182 and another objective 183 onto the mirror strip 184 and the latter deflects the light rays into the reading window 120 of the reading device.

Contrary to the embodiment heretofore described the objective 183 between the reflecting square 182 and the mirror strip 184 is arranged at a distance equal to one half of the focal length ($f_2/2$) of the objective 183 away from the rule 184. The reticle 120 is arranged as heretofore in the focal plane of the objective 183. This arrangement has the result that the objective 181 and also the point of the drill 185 are arranged at a distance equal to the focal length $f_1$ from the measuring rule 180. The distance $f_2/2$ of the objective 183 from the mirror strip is not always easy to adjust, particularly when this distance is apt to change slightly when the tool carrier 186 tilts in its guideway 187.

Figure 9:
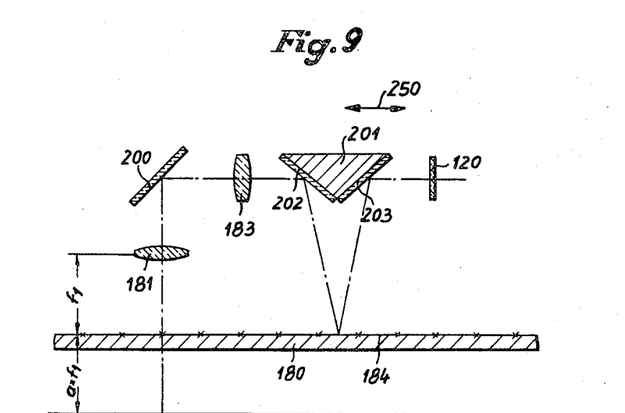
FIG. 9 shows diagrammatically a modified construction of the machine according to FIG. 7.
Figures 10, 11:
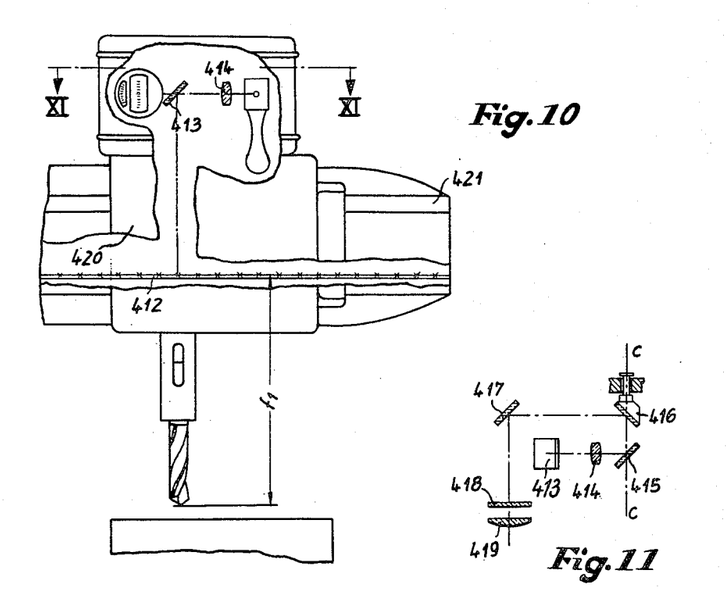
FIG. 10 shows diagrammatically another radial drilling machine with a swinging mirror.
FIG. 11 is a sectional view along the line IX—IX.

In FIG. 9 is illustrated a solution in which the distance $f_2/2$ may be maintained in an easy manner, whereby at the same time a variation of the distance $a$ is possible. The objective 181 is again arranged at a distance equal to the focal length $f_1$ away from the measuring rule 180. The reflecting square 182, however, is replaced by a plane mirror 200. In rear of the objective 183 is arranged a reflector 201 having the mirror faces 202 and 203. The inclination of the mirrors is selected in such manner that the light rays coming from the measuring rule 180 will meet the mirror strip 184 approximately at a right angle. In FIG. 9 the mirror strip 184 for simplicity sake is the same as the measuring rule 180. The light rays are now reflected toward the second mirror face 203 which now reflects the light rays substantially parallel to the measuring rule 180 onto the reticle 120. Obviously, the described modifications of the invention are not limited to the described machine tool types but may be employed wherever it is important to compensate guideway errors.

The embodiments of the invention described in the foregoing have all in common that the element which performs the compensation and retains its position is formed either by a mirror strip which is connected with the base of the machine or is formed by an element which is slidably moved in a plane with a slidable machine part. The following examples will show that the invention is not limited to these elements, but that in place of the described elements there may also be employed swinging elements or a mercury mirror which are subject to the action of gravity.

The FIGS. 10 to 13 inclusive, illustrate the employment of swinging optical elements in a radial drilling machine which latter may for instance be constructed as the one illustrated in FIG. 7. In the FIGS. 10 and 11 the scale lines of a measuring rule 412 are projected by means of a mirror 413 into an objective 414. The light rays passing through the objective 414 are then reflected by two mirrors 415 and 416. The mirror 416 is swingable about an axis C—C which extends transversely to the measuring rule. The swinging movement of the mirror 416 takes place under the action of gravity. The light rays after having been reflected by the reflecting square 415, 416 are projected by means of a mirror 417 onto the reticle 418 of the reading device. The reticle 418 will be observed by a magnifying lens 419. The objective 414 is arranged at a distance equal to its focal length $f_1$ away from the measuring rule 412. The point of the drill likewise is spaced from the measuring rule a distance equal to $f_1$. In case the tool carrier 420 should tilt somewhat in its guideway 421 owing to an error in this guideway, then the swinging mirror 416 will compensate the resulting light ray deflection so that the projected scale line of the measuring rule as formerly will appear at the same point on the reticle 418.

Figure 12:
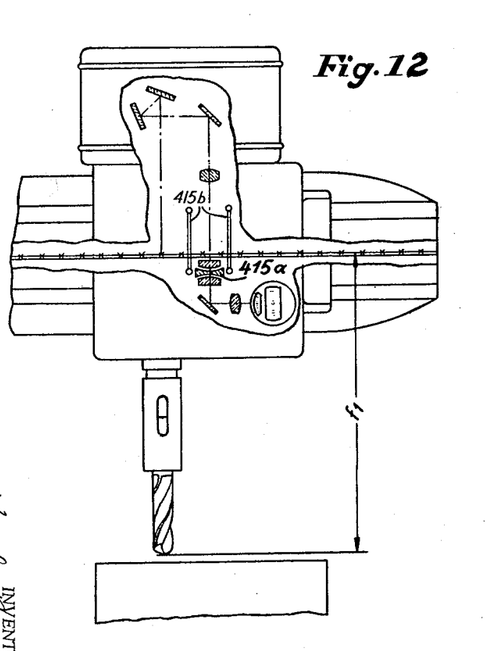
FIG. 12 shows a radial drilling machine according to FIG. 10 but with different compensating means.

In FIG. 12 the swinging mirror 415 is replaced by a swinging lens 415a suspended by the pendulum arms 415b.

Figure 13:
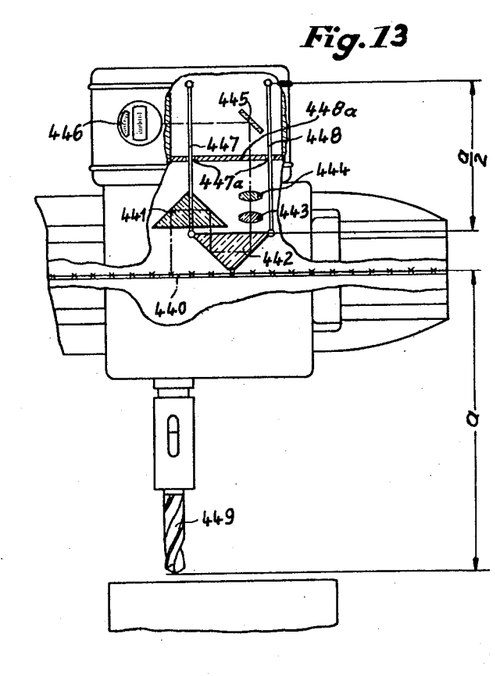
FIG. 13 shows a radial drilling machine according to FIG. 10 with still another compensating means.

In the embodiment of the invention illustrated in FIG. 13 the light rays coming from the measuring rule 440 are first deflected by a prism 441 about an angle of 180°. The light rays then enter a rectangular prism 442 suspended by a double pendulum 447, 448. The prism 442 deflects the light rays again about an angle of 180°. Directly behind the prism 442 is positioned the projection objective 443. A second objective lens 444 collects the light rays and after a reflection by the mirror 445 the light rays reach the focal plane of the reading head 446. If the distance of the point of the drill 449 from the measuring rule 448 is equal to $a$, then the effective length of the arms of the pendulum 447, 448 has to be equal to $a/2$ in order to assure that a compensation is obtained.

In this modification there is the possibility to vary the distance $a$ by varying the length of the pendulum cables or threads in that the threads 447, 448 are caused to pass through very narrow holes 447a in a plate 448a which latter can be adjusted to different elevations.

Figure 14:
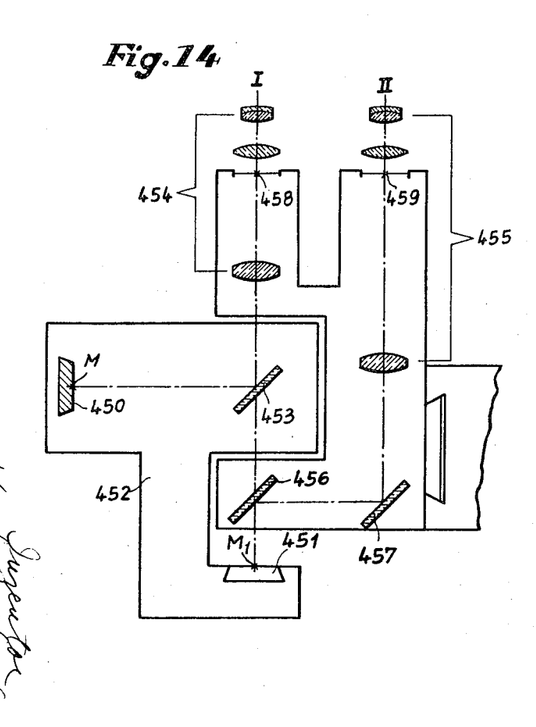
FIG. 14 shows diagrammatically the optical arrangement on a measuring device in which the measuring rule and the part to be measured are arranged in virtual superimposition.

FIG. 14 illustrates diagrammatically a measuring device in which the measuring rule 450 and the testpiece 451 are virtually superimposed by means of a mirror 453 fixedly attached to the base 452. The mirror 453 has approximately the length of the article to be tested. FIG. 14 shows that the measuring point M is projected by the mirror 453 to the measuring point $M_1$. The measuring rule 450 is observed by a slidably arranged microscope 454. The testpiece 451 is observed by means of a second microscope 455. The light rays from the testpiece 451 are conducted into the microscope 455 by the mirrors 456 and 457. Both microscopes are built together in such a manner that their target lines are in alignment.

Figure 15:
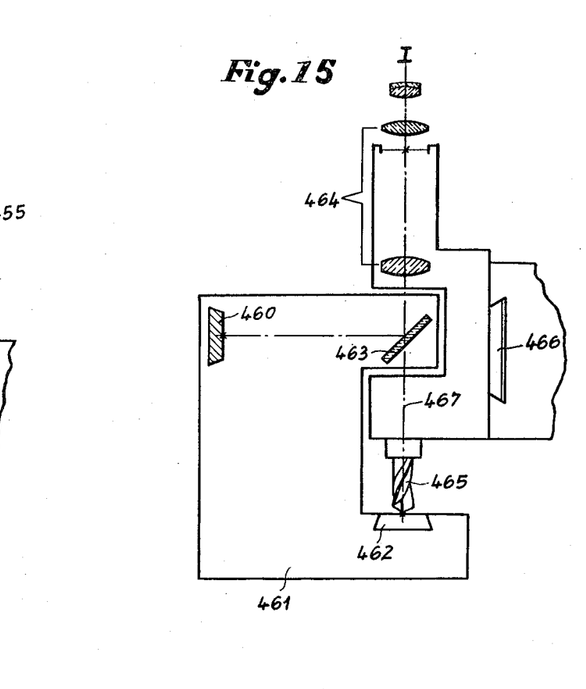
FIG. 15 shows diagrammatically the optical arrangement on a drilling machine in which also the measuring rule and the workpiece are virtually superimposed.

The embodiment of the invention illustrated diagrammatically in FIG. 15 employs the same principle of the virtual superimposition of the measuring rule 460 and the object to be measured in a drilling machine. The measuring rule 460 is again as formerly secured to the base 461 of the machine and the object 462 to be measured is also placed on the base. The image of the measuring rule 460 is projected by means of a stationary mirror 463 into a measuring microscope 464. The microscope 464 and the drill 465 are both slidably mounted in a common guideway 466. The drill 465 is positioned in such a manner that its axis is arranged in the virtual optical axis 467 in rear of the mirror 463. This arrangement assures that the point of the drill will always correctly engage the correct position on the testpiece.

Figure 16:
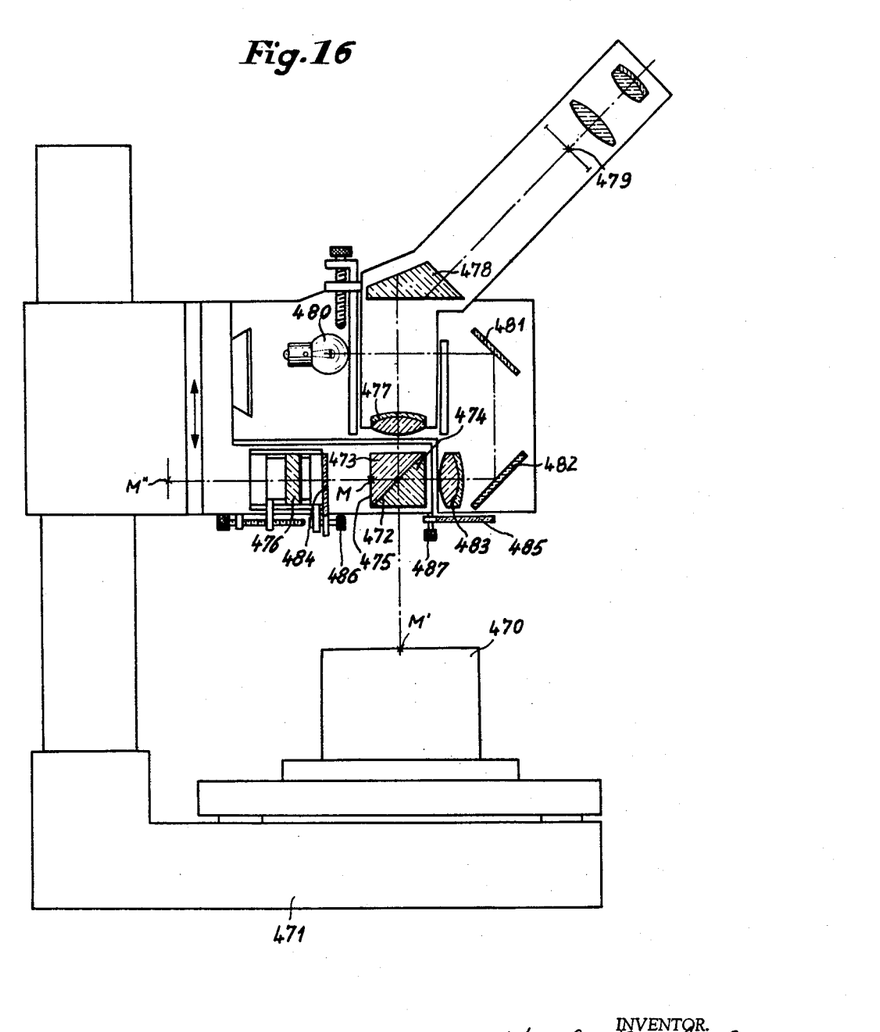
FIG. 16 shows diagrammatically the virtual superimposition of the measuring rule and the object to be measured by a semi-transparent mirror in a measuring microscope equipped with tubular displacement.

FIG. 16 illustrates a measuring microscope with a slidable tube. The workpiece 470 to be measured is placed upon a stationary support 471. This stationary support is connected with the stationary mirror 472 which in this particular embodiment of the invention is semi-transparent. The mirror 472 is positioned between the two rectangular prisms 473 and 474. The measuring rule M is positioned on the outer surface 475 of the prism 473. A mirror 476 projects the scale line M virtually to the point M″. The semi-transparent mirror layer 472 projects the scale lines M″ virtually to the point M′ on the surface of the workpiece M.

An objective lens 477 projects not only the measuring rule but also a portion of the workpiece surface by means of the prism 478 into the focal plane 479 of the ocular of the microscope. The illumination takes place by means of a source of light 480, the rays of which are conducted by means of mirrors 481, 482 and the lens 483 into the path of the measuring rays. For the purpose of obtaining a measurement the microscope is slidably displaced until its optical axis points to the ends of the object to be measured. In these positions it is possible to read the desired values on the outer surface 475.

In this embodiment of the invention one is able to observe in the microscope at the same time not only the measuring rule but also a portion of the surface of the object to be measured. This may not be desirable and may prove to be disturbing. If one does not like this, then it is advisable to arrange a diaphragm 484 between the mirror 476 and the prism 473 and another diaphragm 485 between the prism 474 and the workpiece 470 to be measured. These diaphragms are turnable about axis 486 and 487 so that selectively one or the other path of the light rays may be interrupted.

The mirror 476 is mounted axially slidable. This is of advantage when objects 470 of different height are to be measured. The microscope is arranged in a transverse carriage to be adjustable in its height in order to permit a proper focusing of the microscope.

It is desired to point out that this device may be used in machine tools as well as in other machines. In this case also the distance from the workpiece may be easily adjusted by slidably displacing the mirror 476.

What I claim is:

1. In an optical device for accurately adjusting and reading the amount of displacement of a slidable carriage in a machine or a device, such as a machine tool, linear measurement device or the like, a base, a measuring rule fixedly attached to said base, a guideway in said base, a carriage slidably mounted in said guideway, a reading device having a reticle mounted on said carriage, and optical elements for projecting a portion of said measuring rule onto said reticle of the reading device arranged on said carriage, optical means comprising a plane mirror extending parallel to said measuring rule, and means within said carriage for deflecting the measuring rays coming from said measuring rule onto said mirror which latter reflects the measuring rays onto said recticle in said reading device, said mirror retaining its position relatively to said guideway and compensating the deflections of the measuring rays caused by minor tilting movements of said carriage due to inaccuracies in said guideway.

2. In an optical device for accurately adjusting and reading the amount of displacement of a slidable carriage in a machine or a device, such as a machine tool, linear measurement device and the like, a base, a measuring rule fixedly attached to said base, a guideway in said base, a carriage slidably mounted in said guideway, a reading device having a reticle mounted on said carriage, and optical elements for projecting a portion of said measuring rule onto said reticle of the reading device arranged on said carriage, a mirror strip arranged parallel to said measuring rule and having approximately the same length as the latter, and means within said carriage for deflecting the measuring rays coming from said measuring rule onto said mirror strip which latter reflects the measuring rays onto said reticle in said reading device, said mirror strip compensating the deflection of the measuring rays caused by minor tilting movements of said carriage due to inaccuracies in said guideway.

3. An optical device according to claim 2, in which said deflecting means include a reflecting square for deflecting the measuring rays coming from the measuring rule laterally onto said mirror strip, and including an objective lens in front of said reflecting square.

4. An optical device according to claim 2, in which said deflecting means include a reflecting square for deflecting the measuring rays coming from the measuring strip laterally onto said mirror rule, and including an objective lens in front of said reflecting square, said objective lens being arranged at a distance equal to its focal length from said measuring rule and the distance of said measuring rule from the measuring axis being twice the focal length of said objective lens.

5. In an optical device for accurately adjusting and reading the amount of displacement of a slidable carriage in a machine or a device, such as a machine tool, linear measurement device or the like, a base, a measuring rule fixedly attached to said base, a guideway in said base, a carriage slidably mounted in said guideway, a reading device having a reticle mounted on said carriage, and optical elements for projecting a portion of said measuring rule onto said reticle of the reading device arranged on said carriage, optical means comprising a plane slidable mirror extending parallel to said measuring rule, means forming a guideway for said slidable mirror arranged parallel to said measuring rule, means for operatively connecting said slidable mirror with said carriage, and means within said carriage for deflecting the measuring rays coming from said measuring rule onto said mirror which latter reflects the measuring rays onto said reticle in said reading device, said mirror compensating the deflections of the measuring rays caused by minor tilting movements of said carriage due to inaccuracies in said guideway.

6. An optical device according to claim 5, including a further carriage on which said slidable mirror is fixedly mounted, said further carriage being slidably mounted in said means forming a guideway for said slidable mirror arranged parallel to said measuring rule and parallel to the guideway for the carriage on which said reading device is mounted.

7. An optical device according to claim 5, particularly for a linear measurement machine, in which said optical elements for projecting the measuring rays coming from said measuring rule onto said reticle of the reading device including an objective lens.

8. An optical device according to claim 5, particularly for a linear measuring machine, in which said optical elements for projecting the measuring rays coming from said measuring rule onto said reticle of the reading device include an objective lens, at least one mirror arranged in the rear of said objective lens deflecting the measuring rays at an angle onto said slidable mirror, and another objective lens for receiving the rays reflected by said slidable mirror and projecting the same onto said reticle.

References Cited by the Examiner
UNITED STATES PATENTS

| | | | |
|---|---|---|---|
| 1,524,089 | 1/25 | Eppenstein | 88—2.7 |
| 2,368,434 | 1/45 | Turrettini | 88—14 X |
| 2,402,856 | 6/46 | Turrettini | 88—14 |
| 2,474,602 | 6/49 | Turrettini | 33—147 |

JEWELL H. PEDERSEN, *Primary Examiner.*

EMIL G. ANDERSON, WILLIAM MISIEK, *Examiners.*